United States Patent [19]
Sniadower

[11] Patent Number: 6,031,646
[45] Date of Patent: Feb. 29, 2000

[54] OPTICAL FIBER TELECOMMUNICATION SYSTEM

[75] Inventor: Lucjan Sniadower, Paris, France

[73] Assignee: Pirelli Cavi e Sistemi S.p.A., Milan, Italy

[21] Appl. No.: 09/090,405

[22] Filed: Jun. 4, 1997

[30] Foreign Application Priority Data

Jun. 6, 1997 [EP] European Pat. Off. .............. 97109212

[51] Int. Cl.[7] ..................................................... H04B 10/00
[52] U.S. Cl. ........................... 359/160; 359/134; 359/341
[58] Field of Search ..................................... 359/127, 134, 359/160, 173, 179, 341

[56] References Cited

U.S. PATENT DOCUMENTS

| | | | |
|---|---|---|---|
| 5,140,456 | 8/1992 | Huber | 359/341 |
| 5,185,826 | 2/1993 | Delavaux | 388/24 |
| 5,287,216 | 2/1994 | Chirravuri et al. | 359/341 |
| 5,623,362 | 4/1997 | Mitsuda et al. | 359/341 |
| 5,731,892 | 3/1998 | DeGiovanni et al. | 359/341 |
| 5,852,510 | 12/1998 | Meli et al. | 359/341 |

FOREIGN PATENT DOCUMENTS

| | | |
|---|---|---|
| 0 459 685 A2 | 12/1991 | European Pat. Off. . |
| 0 497 246 B1 | 8/1992 | European Pat. Off. . |
| 0 508 880 B1 | 10/1992 | European Pat. Off. . |
| 0 677 902 A1 | 10/1995 | European Pat. Off. . |
| 0 729 248 A2 | 8/1996 | European Pat. Off. . |

OTHER PUBLICATIONS

P. Wysocki et al., "Dual–stage erium–doped, erbium/ytterbium–codoped fiber amplifier with up to +26–dBm output power and a 17–nm flat spectrum", Optics Letters, 21(21):1744–1746 (1996).

Y. Tahura et al., "Semiconductor Laser Pump Module with 240mW Output around 1.47 $\mu$m Band", IOOC'89, Kobe, Japan, p. 82–83 (1989).

*Primary Examiner*—Kinfe-Michael Negash
*Attorney, Agent, or Firm*—Finnegan, Henderson, Farabow, Garrett & Dunner, L.L.P.

[57] ABSTRACT

The present invention relates to an optical fiber telecommunications system and more in particular to an optical telecommunications system having a high loss transmission line. The optical fiber telecommunications system includes a transmission station producing at least one transmission signal in a predetermined wavelength band carrying the information, a receiving station for receiving said transmission optical signal, an optical fiber line connecting the transmission station and the receiving station, and at least one optical fiber amplifier connected along the line for amplifying the transmission optical signal, the amplifier having a total optical output power greater than 20 dBm. The fiber optic amplifier for amplifying a transmission signal including a first stage and a second stage, an isolator placed between the first stage and the second stage where the second stage includes an erbium doped fiber, pump means including two pump sources at different wavelengths in a second stage pump wavelength band, A WDM coupling means coupling the different wavelengths as a composite second stage pump signal, and a coupler coupling the composite second stage pump signal and the transmission optical signal to the erbium doped fiber.

31 Claims, 13 Drawing Sheets

OPTICAL FIBER TELECOMMUNICATION SYSTEM

FIELD OF THE INVENTION

The present invention relates to an optical fiber telecommunication system and more in particular to an optical telecommunication system having a high loss transmission line.

It relates also to an optical fiber amplifier doped with a rare earth, such as erbium, for use in said system.

BACKGROUND OF THE INVENTION

In recent times the use of optical fibers to send optical signals carrying the information from a transmission station to a receiving station has become well known in the telecommunication field.

Optical signals sent over an optical fiber undergo attenuation so that it may be necessary to amplify the signal level at the side of the transmission station by a booster optical amplifier.

An optical preamplifier is usually made available at the receiving station to bring the signal level to a range of values that is appropriate for a receiving apparatus. Known optical amplifiers are those based on the properties of a fluorescent dopant (erbium for example) that, if suitably excited by administration of luminous energy, gives a high emission in the wavelength band corresponding to the minimum light attenuation in silica-based optical fibers.

Optical fiber amplifiers, such as erbium doped optical fiber amplifiers are known, for example, from the patent application EP 0 677 902.

Many of the optical fiber links presently in use operate with a limited throughput, in comparison to the data transmission rates that can be reached by available transmitting and receiving equipments. For example, bit rates lower than 1 Gbit/s are in use for transmission of digital signal, while transmitting and receiving equipments working at 2.5 Gbit/s or at even longer rates are currently available. To allow an error free transmission on existing lines with an increased data throughput, the signal to noise ratio at the receiver station should be correspondingly increased. This can be achieved, for example, by increasing the level of the signal at the receiving station. For a given line, a 3 dB signal level increase allows to double the bit rate of the transmitted signal with the same bit error rate.

This can be done by providing line amplifiers at one or more locations at predetermined intervals along the fiber, to periodically raise the power of the transmitted optical signal.

Line amplifiers, however, are expensive and require maintenance. Further, addition of line amplifiers may not be feasible along existing fiber lines, such as e.g. for fiber lines lodged in submarine cables, or in other cables of difficult access.

The Applicant was faced with the problem of providing an increased data throughput in existing high span loss telecommunication lines, without adding line optical amplifiers.

In particular, the Applicant has observed that no known optical booster amplifiers can be used in a telecommunication system in which two signals at a bit rate of 2.5 Gbit/s are transmitted on a single span of optical fiber having an attenuation of 58 dB and an expected signal at the input of the preamplifier of −38 dBm.

The Applicant has perceived the possibility of solving the problem by providing a booster with a increased output power.

To obtain a booster with such performances, namely a very high output power, the Applicant considered to increase the pumping power applied to the optical active fiber.

Lasers, ad in particular laser diodes are convenient sources for pumping erbium single mode amplifiers, but the power available from a typical laser diode is limited.

For the above and other reasons it is difficult to provide high output power optical amplifiers.

Further a high output power optical amplifier should be relatively noise free, in particular for CATV (cable television) applications.

The patent U.S. Pat. No. 5,140,456 discloses a rare earth doped optical fiber amplifier pumped at a first wavelength selected to provide a low noise figure, and at a second wavelength selected to provide a high power efficiency. An erbium doped fiber amplifier is illustrated, in which the first wavelength is about 980 nm and the second wavelength is about 1480 nm. The travelling wave erbium fiber amplifier illustrated operates like a two stage amplifier, although there is an overlapping of the stages.

Other optical amplifiers are disclosed in the patent applications EP 497 246 and EP 508 880.

The patent U.S. Pat. No. 5,623,362 discloses a 980 nm/1480 nm band hybrid pumped fiber amplifier with a pump light isolator, installed between the output portion of the first optical fiber and the input portion of the second optical fiber of an amplifier. From the graphics reported in the patent a maximum output power of about 20 dBm has been obtained with 200 mW of total pump power.

The patent U.S. Pat. No. 5,287,216 discloses a doped fiber which is simultaneously pumped by multiple pump lasers generating optical waves of different wavelengths, (in the 960–1000 nm wavelength window). Of the two most common types of pump lasers, 1480 and 980 nm, the later is more efficient and also results in lower noise in the amplifier, making it the wavelength of choice from the perspective of performance. The use of multiple pump lasers decreases the power requirements of each laser, reduce the cost of the amplifier, and increases reliability without compromising the gain of the amplifier. The patent U.S. Pat. No. 5,185,826 discloses a cascaded hybrid pumping arrangement for doped fiber amplifiers.

The article of Y. Tamura, S. Shukii, Y. Kawai with the title "Semiconductor laser pump module with 240 mW output around 1.47 $\mu$m band", IOOC 89, Kobe, Japan, discloses that a pump module having output of 240 mW was achieved in a single mode fiber by coupling the output of four 1.47 $\mu$m band semiconductor lasers using wavelength division and polarizing multiplexing.

The Applicant has observed that polarization multiplexing technique is applicable only for combining lasers in the 1480 nm band, and not to other bands, such as, e.g. the 980 nm band, because no polarization maintaining fibers are available for this band.

The polarization multiplexer technique requires an emission of orthogonal polarized lights from two lasers and the use of polarization maintaining fibers. The two orthogonal polarized lights have to be multiplexed with a multiplexing device as a polarization beam combiner (PBC). The insertion loss of the PBC is relatively high, more than 1 dB, and the output power from the amplifier will suffer because of this high insertion loss.

None of the amplifiers described in the cited documents have the required performances.

SUMMARY OF THE INVENTION

According to the present invention the Applicant has found that an optical fiber amplifier with a high output power and a low noise figure NF can be made by the combined use of multiple pumping and of multiple stage amplifier.

In particular a wavelength division multiplexing (WDM) pumping technique for both 980 nm and 1480 nm pump lasers has been used.

This technique has low insertion loss of the WDM coupler, it is possible to avoid polarization maintaining fibers and polarization couplers, and has god temperature stability.

According to a first aspect, the present invention relates to an optical fiber telecommunication system comprising:

a transmission station producing at least one transmission optical signal in a predetermined wavelength band carrying the information;

a receiving station for receiving said transmission optical signal;

an optical fiber line connecting said transmission station and said receiving station, and at least one optical fiber amplifier connected along said line for amplifying said transmission optical signal, said amplifier having a total optical output power greater than 20 dBm.

Preferably said total optical output power is at least 22 dBm.

Preferably said amplifier is placed closer to the transmission station than to the receiver station.

Preferably said predetermined wavelength band is between 1530 nm and 1560 nm.

In particular said transmission optical signal is a WDM transmission optical signal.

Preferably the optical fiber telecommunication system further comprises a preamplifier for amplifying said transmission optical signal connected in series along said optical fiber line.

More preferably said preamplifier is placed closer to the receiving station than to the transmitting station.

Preferably said amplifier for amplifying a transmission optical signal comprises a first stage and a second stage; said second stage comprising:

an erbium doped fiber;

pump means comprising two pump sources at different wavelengths in a second stage pump wavelengths band;

a WDM coupling means coupling said different wavelengths as a composite second stage pump signal;

a coupler coupling said composite second stage pump signal and said transmission optical signal to said erbium doped fiber.

Preferably said first stage comprises:

an erbium doped fiber;

pump means comprising one pump source at a wavelength in a first stage pump wavelength band;

a coupler coupling said pump wavelength and said transmission optical signal to said erbium doped fiber.

More preferably said first stage comprises:

an erbium doped fiber;

pump means comprising two pump sources at different wavelengths in a first stage pump wavelength band;

a WDM coupling means coupling said different wavelengths as a composite first stage pump signal;

a coupler coupling said composite first stage pump signal and said transmission optical signal to said erbium doped fiber.

Preferably said composite first stage pump signal and said transmission optical signal are co-propagating.

Preferably said composite second stage pump signal and said transmission optical signal are counter-propagating.

Preferably at least one of said pump sources comprises a fiber grating filter.

More preferably two of said pump sources of one amplifier stage comprise fiber grating filters.

Advantageously said first stage pump wavelength band is in the range of 960–1000 nm.

Advantageously said second stage pump wavelength band is in the range of 1450–1500 nm.

Preferably said first stage precedes said second stage in the transmission optical signal direction.

Preferably the amplifier further comprises an isolator placed between the first stage and the second stage.

Preferably the amplifier further comprises an isolator at the input of the first stage.

Preferably the amplifier further comprises an isolator at the output of the second stage.

Preferably the wavelength distance of said two pump sources at different wavelengths in a second stage pump wavelength band is less than 30 nm.

Preferably the wavelength distance of said two pump sources at different wavelengths in a first stage pump wavelength band is less than 15 nm.

Advantageously said WDM coupling means includes an interferential filter.

According to a second aspect, the present invention relates to a method for amplifying a light signal comprising the steps of:

supplying a pump signal having at least one wavelength in the range of 960–1000 nm to a first rare earth doped optical fiber;

supplying a pump signal having at least one wavelength in the range of 1450–1500 nm to a second rare earth doped optical fiber;

supplying said transmission optical signal to said first and said second rare earth doped optical fiber;

obtaining a predetermined total optical output power from said second rare earth doped optical fiber greater than 20 dBm;

preventing the light to travel from said second rare earth doped optical fiber to said first rare earth doped optical fiber.

Preferably said predetermined total optical output power from said second rare earth doped optical fiber is of at least 22 dBm.

Preferably said pump signal in a first rare earth doped optical fiber and said transmission optical signal are co-propagating.

Preferably said pump signal in a second rare earth doped optical fiber and said transmission optical signal are counter-propagating.

Advantageously the total optical power at the input of said second rare earth doped optical fiber is at least 17 dBm.

According to a third aspect, the present invention relates to an optical fiber amplifier for amplifying a transmission optical signal comprising:

a first stage and a second stage;

an isolator placed between the first stage and the second stage;

in which said first stage comprises:

an erbium doped fiber;

pump means comprising one pump source at a wavelength in a first stage pump wavelength band;

a coupler coupling said pump wavelength and said transmission optical signal to said erbium doped fiber; and said second stage comprises:
an erbium doped fiber;
pump means comprising two pump sources at different wavelengths in a second stage pump wavelengths band;
a WDM coupling means coupling said different wavelengths as a composite second stage pump signal;
a coupler coupling said composite second stage pump signal and said transmission optical signal to said erbium doped fiber.

More preferably said first stage comprises:
an erbium doped fiber;
pump means comprising two pump sources at different wavelengths at different wavelengths in a first stage pump wavelength band;
a WDM coupling means coupling said different wavelengths as a composite first stage pump signal;
a coupler coupling said composite first stage pump signal and said transmission optical signal to said erbium doped fiber.

Advantageously said second stage has a total optical output power greater than 20 dBm.

More advantageously said total optical output power is at least 22 dBm.

Preferably second stage has a total optical input power greater than 17 dBm.

BRIEF DESCRIPTION OF THE SEVERAL VIEWS OF THE DRAWINGS

More details will become apparent from the following description, with reference to the accompanying drawings, in which.

DETAILED DESCRIPTION OF THE INVENTION

Figure 1A:
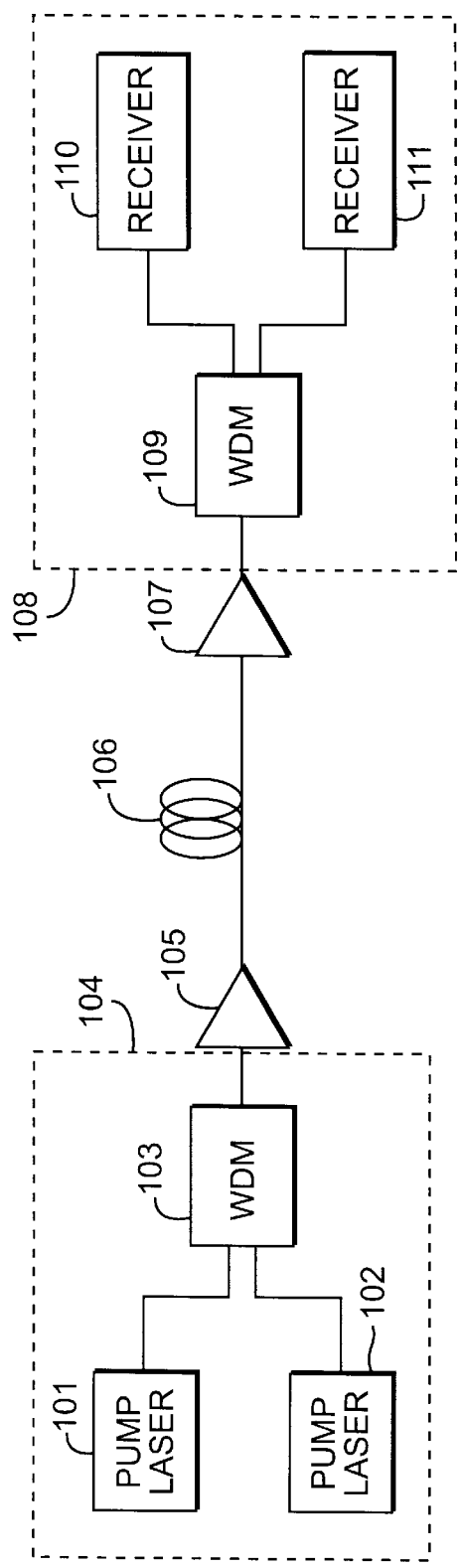
FIG. 1a shows a block diagram of an optical fiber telecommunication system according to the present invention.

With reference to FIG. 1a, that shows a block diagram of an optical fiber telecommunication system according to the present invention, a transmission station 104 comprises two lasers 101 and 102 as signal sources emitting two transmission optical signals at different wavelengths, and a WDM multiplexer 103 for coupling said two transmission optical signals.

The two different wavelengths are for example of 1535 nm and 1539 nm. The transmission optical signals are modulated by two independent signals at a bit rate of 2.5 Gbit/s, either by direct modulation of lasers 101, 102, or by appropriate modulating means external to lasers 101, 102, not shown. The coupled signals are applied to a booster amplifier 105 of the type of the one described in the following. The amplified signals are applied to an input end of a single span (without repeaters) of an optical fiber 106, for example of the dispersion shifted type. A preamplifier 107 is connected at the output end of the optical fiber 106. The optical signal at the output of the preamplifier 107 is connected to a receiving station 108 comprising a WDM demultiplexer 109 and two receivers 110 and 111.

The WDM demultiplexer 109 selects the signal on the basis of the wavelength and supplies each signal to a respective receiver 110 or 111.

The length of the span is 260 Km. The fiber attenuation at the signal's wavelength is of about 0.21 dB/Km. The equivalent span loss is about 58 dB, if reasonable safety margins are taken into account, e.g. to consider an increase in the fiber attenuation due to ageing or to the cable installation.

The expected signal at the input of the preamplifier 107 is preferably −38 dBm. The output power of the booster amplifier 105, as later described, is of 20 dBm for each of the two wavelengths, that is the amplifier 105 is able to provide a total output power of 23 dBm.

Figure 1B:
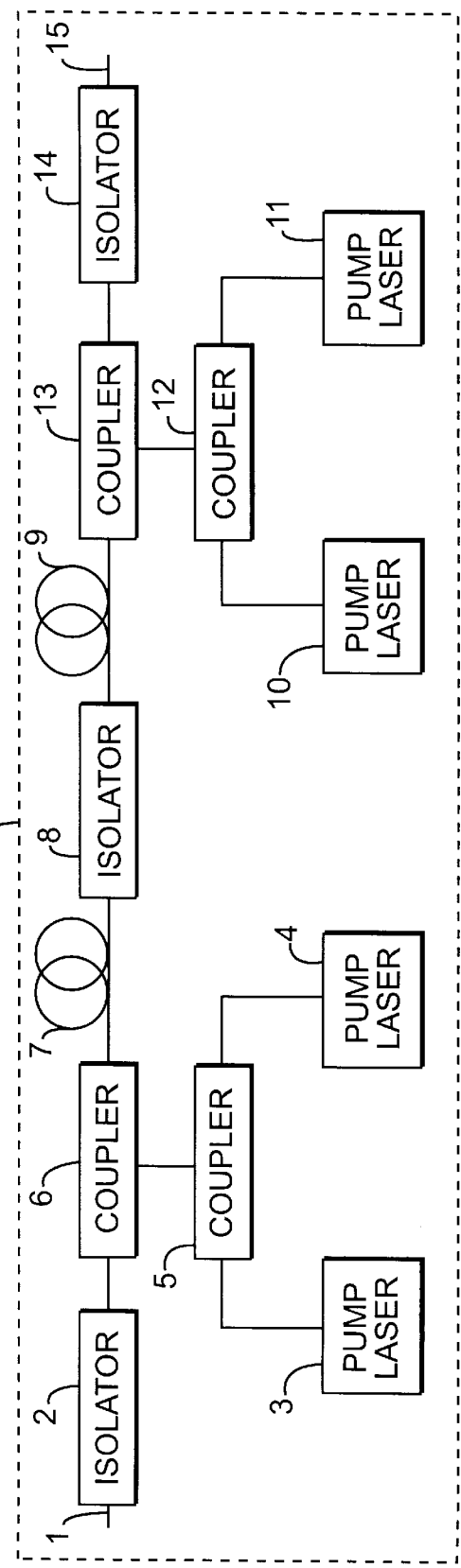
FIG. 1b shows a block diagram of an optical fiber amplifier according to the present invention.

With reference to FIG. 1b, that shows a block diagram of an optical fiber amplifier 105 according to the present invention, a transmission optical signal to be amplified is applied at point 1, then forwarded to an optical isolator 2. Such transmission optical signal has a wavelength preferably in the range of about 1530–1560 nm and generated by a single wavelength laser light source or by a multiwavelength (WDM) source.

After the optical isolator 2 the optical signal is applied to a first input of a coupler 6.

A pump signal at a first wavelength, that is provided by a pump laser 3, is coupled by a coupler 5 with a pump signal at a second wavelength that is provided by a pump laser 4. The wavelength of the pump laser 3 is for example between 960 and 980 nm. The wavelength of the pump laser 4 is for example between 980 and 1000 nm. The coupler 5 is preferably a WDM coupler.

In general, the two pump wavelengths are coupled together by a WDM coupling means. By WDM coupling means to the purposes of the present invention we mean an apparatus or device which is capable of combining two input signals having different wavelengths into a single output fiber, preferably with minimal losses. Examples of such means are interferential filters, fused fiber couplers, dichroic mirrors and the like, selected according to the performances required. The two coupled pump signals, at the output of the coupler 5, are applied to a second input of the coupler 6. The optical signal and the two coupled pump signals, both applied respectively to the first and the second input of the coupler 6, are coupled preferably in co-propagating mode.

The optical signal at the output of the coupler 6 is applied to an input of a first rare earth doped optical fiber 7.

The optical signal at the output of the optical fiber 7 is applied to an optical isolator 8 and consequently to an input of a second rare earth doped optical fiber 9.

The optical fibers 7 and 9 are preferentially silica-based optical fibers and comprise preferably erbium as rare earth dopant. As secondary dopants, aluminium, germanium, phosphorous and fluorine may be advantageously used. After the optical fiber 9 the optical signal is applied to a first input of a coupler 13.

A pump signal at a third wavelength, that is provided by a pump laser 10, is coupled by a coupler 12 with a pump signal at a fourth wavelength that is provided by a pump laser 11. The wavelength of the pump laser 10 is for example between 1450 and 1480 nm. The wavelength of the pump laser 11 is for example between 1480 and 1500 nm. The coupler 12 is preferably a WDM coupler, and in general a WDM coupling means.

The two coupled pump signals, at the output of coupler 12, are applied to a second input of coupler 13. The two coupled pump signals, applied to the second input of coupler 13, are coupled preferably in counter-propagating mode with respect to the optical signal, that is coupled to the first input of coupler 13. The optical signal at the output of optical coupler 13 is applied preferably to an optical isolator 14 and consequently to an output at point 15.

The optical isolators 2, 8 and 14 limit the effects of optical reflections and backscattering, allowing the amplifier 105 to operate in a stable manner.

In particular, optical isolator 8 located between the two stages, prevents the light from said second rare earth doped optical fiber (in particular the residual pump light and counter propagating spontaneous emission from the second stage) to said first rare earth doped optical fiber from being coupled back.

Further, because it shows a high attenuation in the first pumping wavelength band of 960 to 1000 nm, optical isolator 8 prevents the residual pump light from the first rare earth doped optical fiber from reaching the second rare earth doped optical fiber. In this way the pump signals of the two stage are isolated and coupled each to their respective stage, so that instability problem are reduced. The two couplers 5 and 12 are selected so that they allow coupling of the emission wavelengths of the two pump lasers 3, 4 and, respectively, 10, 11. In particular the emission wavelength of each couple of pump lasers 3, 4 and 10, 11 should be slightly shifted in respect to the optimum pumping wavelength (980 nm and 1480 nm). This shift should be wide enough to avoid the crosstalk and interferences between the pumps, through the WDM couplers 5 and 12, and consequent power losses. However the shift is limited by the extension of the pumping band, in order to guarantee a good pumping efficiency in the active fiber.

For the purposes of the present description, an amplifier stage comprises a pumping system comprising at least a pump source, providing a pump signal, a coupler, for combining a pump signal with an optical signal, and a doped optical fiber to which the combined signals are coupled.

An amplifier according to the present invention comprises two stages connected together with an optical isolator 8 interposed. Preferably it comprises an optical isolator 14 at the output of the second stage. Preferably, it comprises an optical isolator 2 at the input of the first stage.

With reference to the block diagram of FIG. 1b, an example of an amplifier 105 made and tested by the Applicant will be now described.

A suitable coupler 6 for this invention is a WDM coupler at the wavelength of 980/1550 nm, from E-TEK model SWDMCPRAPSA10.

Figure 2:
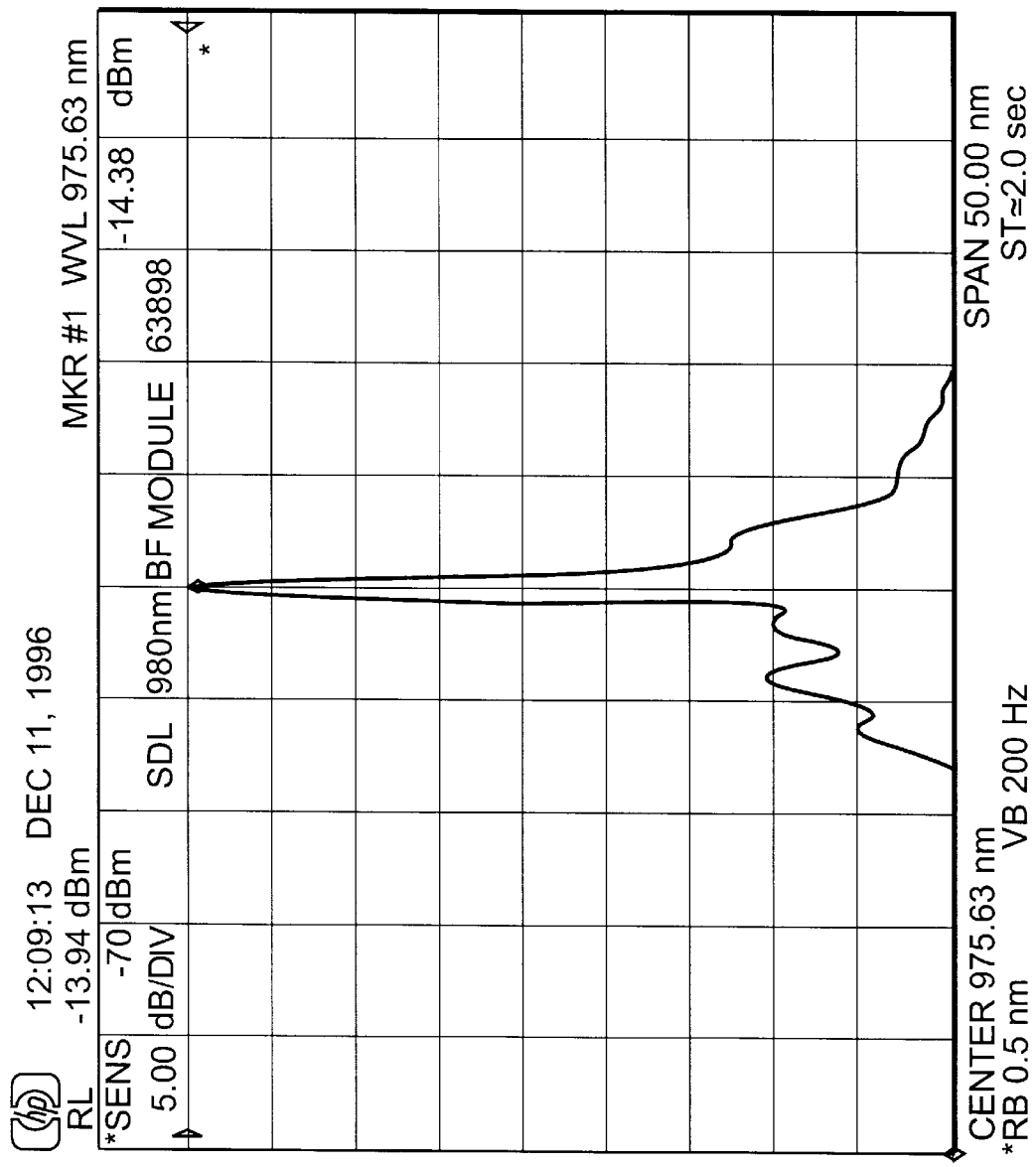
FIG. 2 shows the spectrum of laser 3 shown in FIG. 1b.

The pump laser 3 is a wavelength stabilized laser module (laser with fiber grating) at the wavelength of about 975 nm, from SDL model SDLO-2100-CN; its output spectrum is shown in FIG. 2. This pump laser 3 shows a very narrow emission band of about 3 nm due to the fiber grating placed on the fiber pigtail connected to the laser chip.

Figure 3:
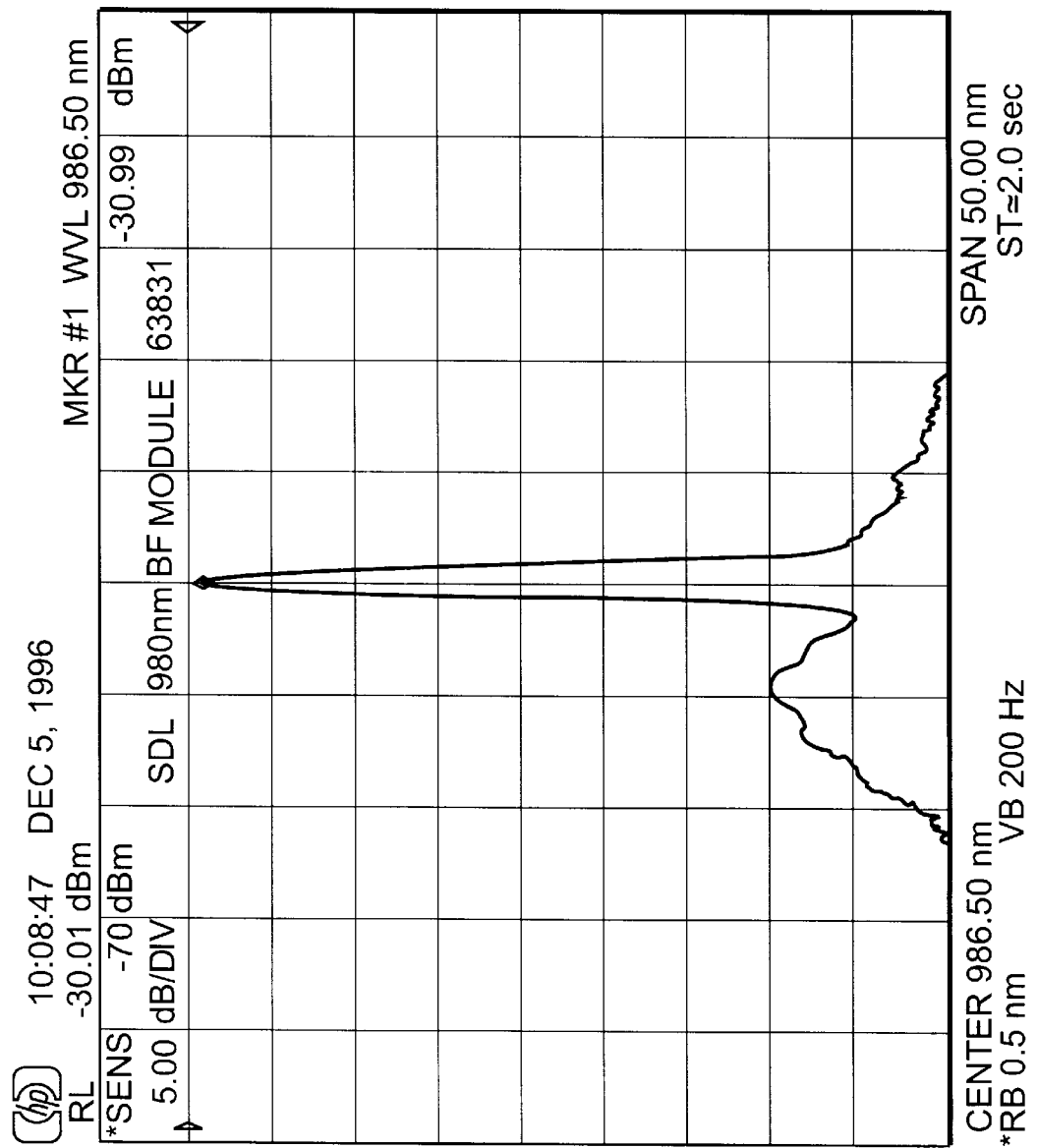
FIG. 3 shows the spectrum of laser 4 shown in FIG. 1b.

The pump laser 4 is a wavelength stabilized laser module (laser with fiber grating) at the wavelength of about 986 nm, from SDL model SDLO-2100-CJ; the spectrum is shown in FIG. 3. This pump laser 4 shows a very narrow emission band of about 3 nm due to the fiber grating placed on the fiber pigtail connected to the laser chip.

In the case of pump lasers of the type with gratings it is possible to reduce the shift entity of the two emission wavelengths of the two coupled pump lasers, because of the narrow emission band of each of the lasers.

Moreover using pump laser with a narrow emission band, it is possible to increase the pumping efficiency, because the two wavelengths can be very close to each other, within few nanometers, in the regions of highest efficiency for each of the two bands, without any risk of crosstalks between pump lasers. In addition, the proximity of the pump wavelengths to the region of highest efficiency reduces the noise figure of the amplifier. This is due to the reduction of the spontaneous emission from excited bands.

Figure 4A:
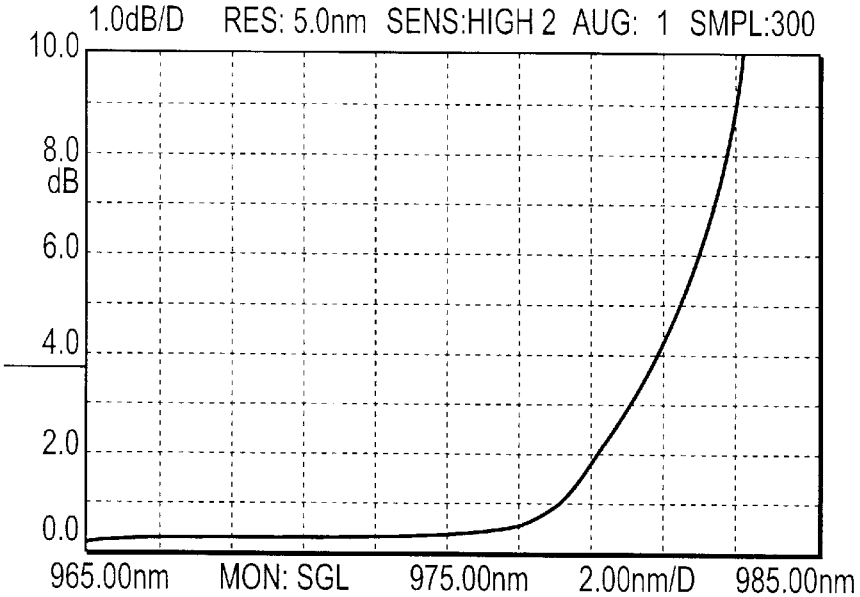
FIG. 4a and 4b show the losses as a function of wavelength of coupler 5 shown in FIG. 1b.
Figure 4B:
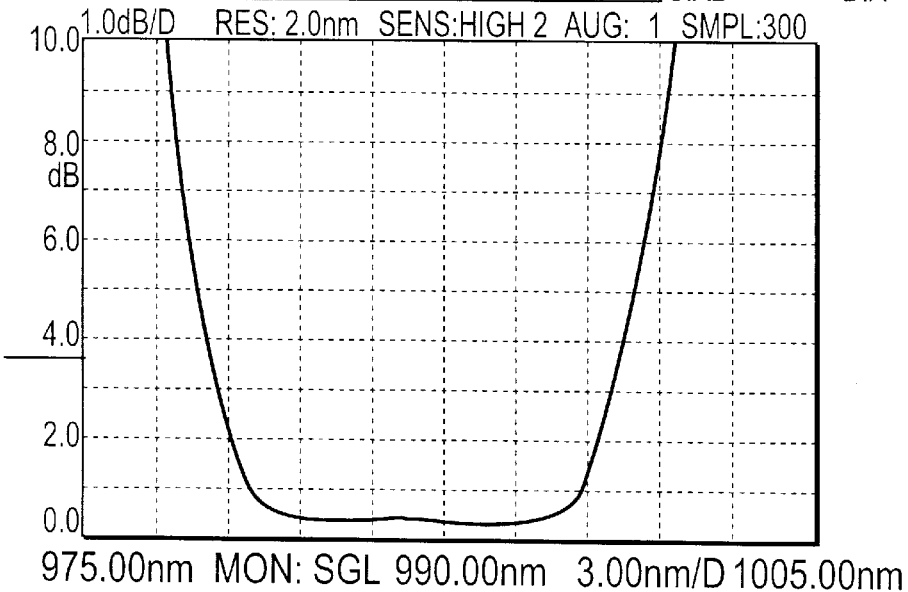

Coupler 5 is a WDM coupler at 970/990 nm, from JDS model WD0909. In FIG. 4a and 4b the losses as a function of wavelength are shown. In particular, in FIG. 4a there are shown the losses along the path from laser 3 (975 nm) to coupler 6, and in FIG. 4b there are shown the losses along the path from laser 4 (986 nm) to coupler 6.

Optical fibers 7 and 9 are produced by the Applicant.

In the example, fibers 7 and 9 are silica-based fibers, with the core having the following composition, expressed with respect to silica:

$Er_2O_3$=600 ppm, $Al_2O_3$=0.5 % mol, $GeO_2$=7 % mol

Said fiber has a numerical aperture of about 0.195 and a cut-off wavelength between 900 and 980 nm. The fiber lengths are of about 13 m for fiber 7 and 19 m for fiber 9.

Figure 5:
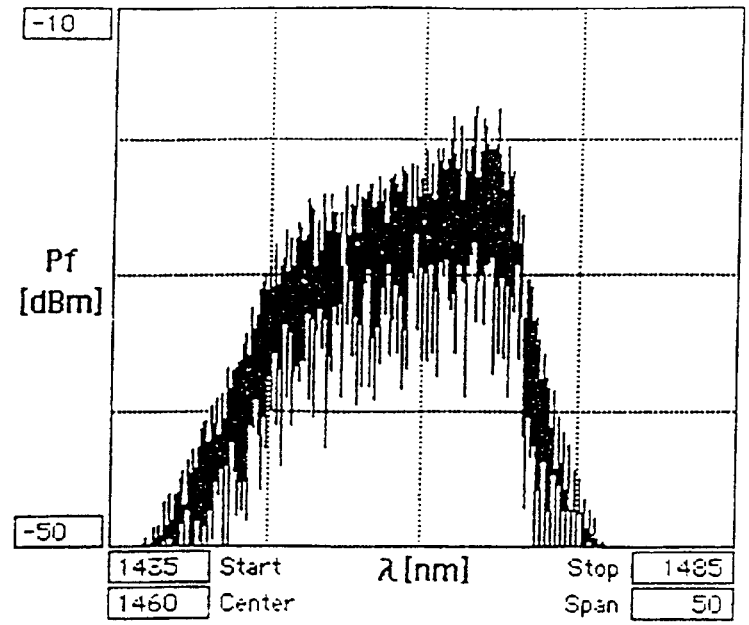
FIG. 5 shows the spectrum of laser 10 shown in FIG. 1b.

The pump laser 10 is a Fabry Perot laser with a center emission wavelength of about 1460 nm, from FURUKAWA model FOL1402PAZ-P1, whose spectrum is shown FIG. 5. A laser diode module with fiber grating from SUMITOMO model SLA5620-XA/PR1 can be also advantageously used.

Figure 6:
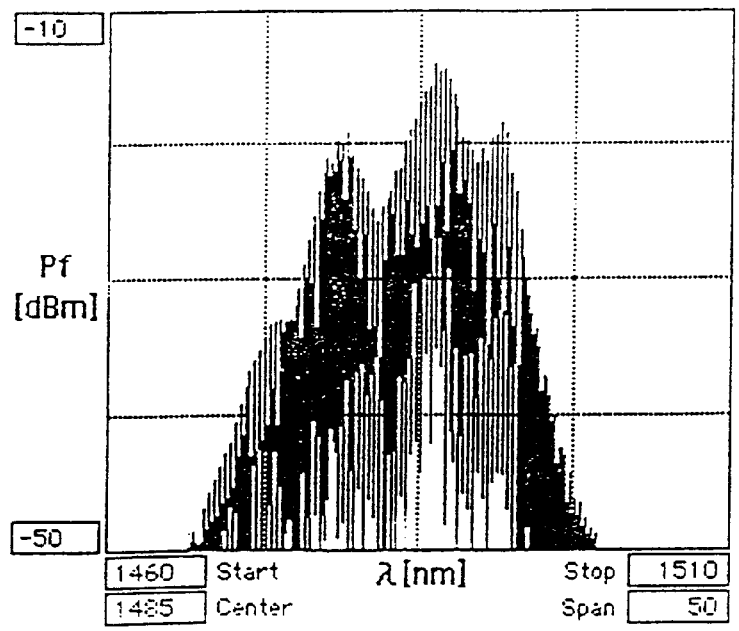
FIG. 6 shows the spectrum of laser 11 shown in FIG. 1b.

The pump laser 11 is a Fabry Perot laser with a center emission of about 1485 nm, from FURUKAWA model FOL1402PAZ-P2, whose spectrum is shown in FIG. 6. A laser diode module with fiber grating from SUMITOMO model SLA5620-XB/PR1 can be also advantageously used.

Figure 7A:
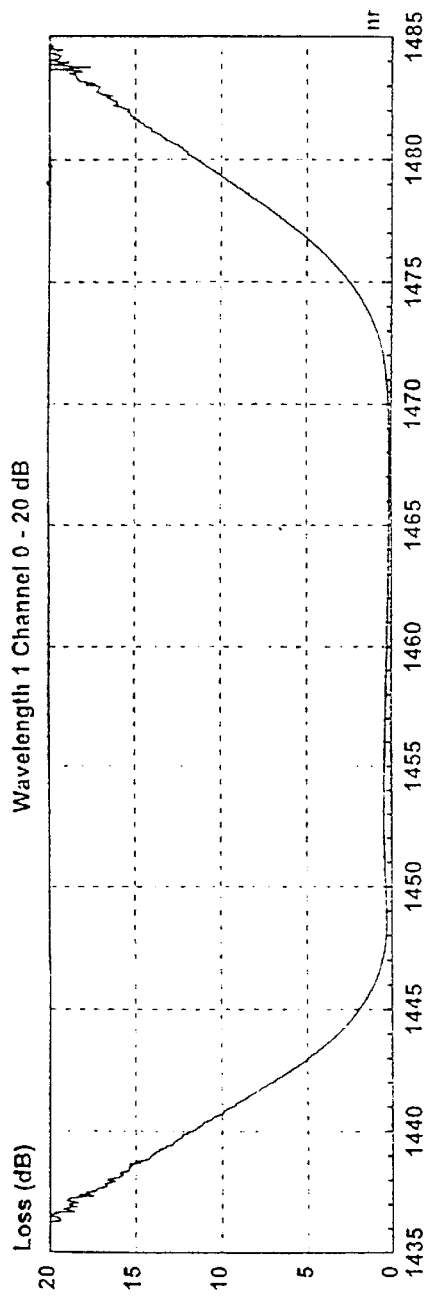
FIG. 7a and 7b show the losses as a function of wavelength of coupler 12 shown in FIG. 1b.
Figure 7B:
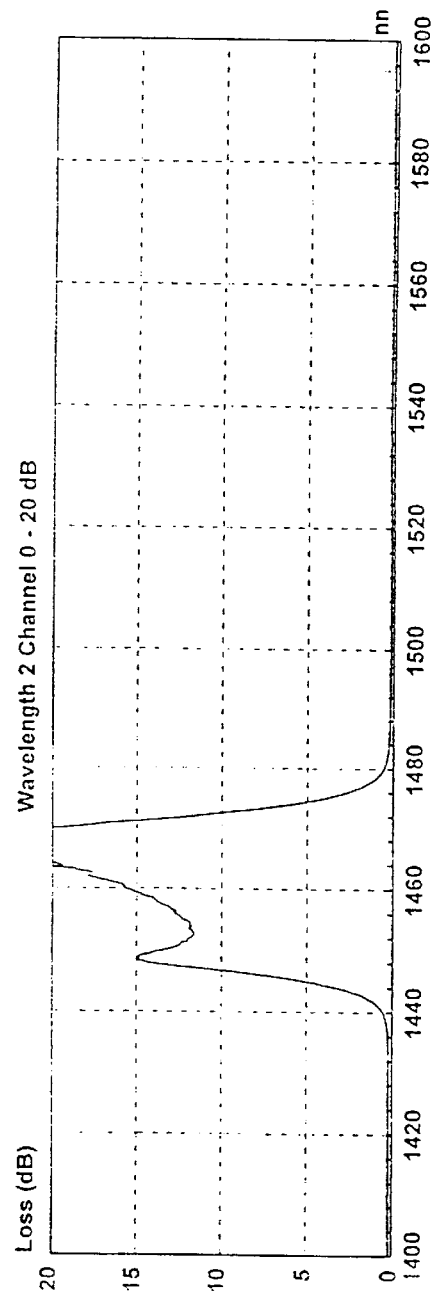

Coupler 12 is a WDM coupler at 1460/1550 nm, from JDS model WD1414A-A30. In FIG. 7a and 7b the coupler losses are shown as a function of the wavelength. In particular in FIG. 7a there are shown the losses along the path from laser 10 (1460 nm) to coupler 13, and in FIG. 7b there are shown the losses along the path from laser 11 (1485 nm) to coupler 13.

Figure 8A:
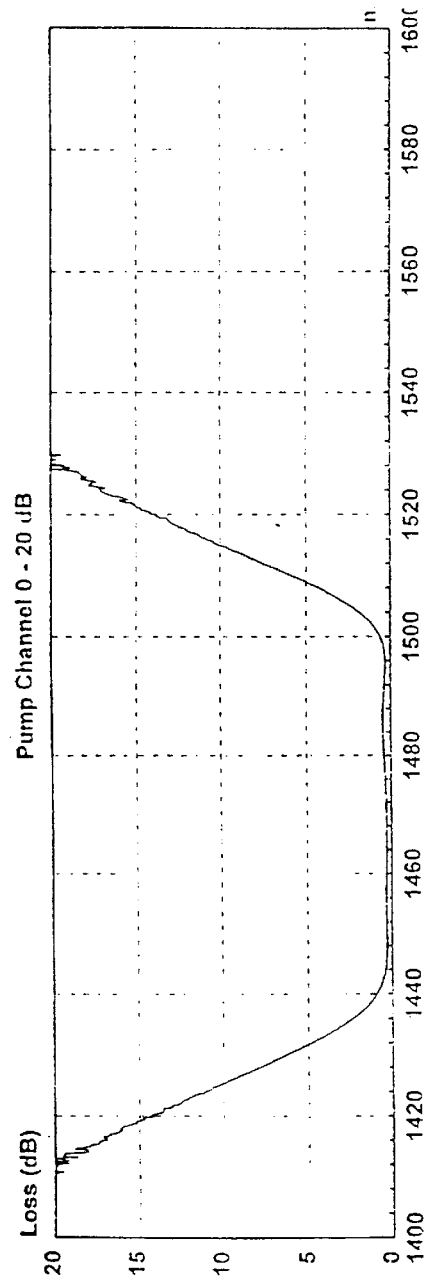
FIG. 8a and 8b show the losses in function of the wavelengths of the coupler 13 shown in FIG. 1b.
Figure 8B:
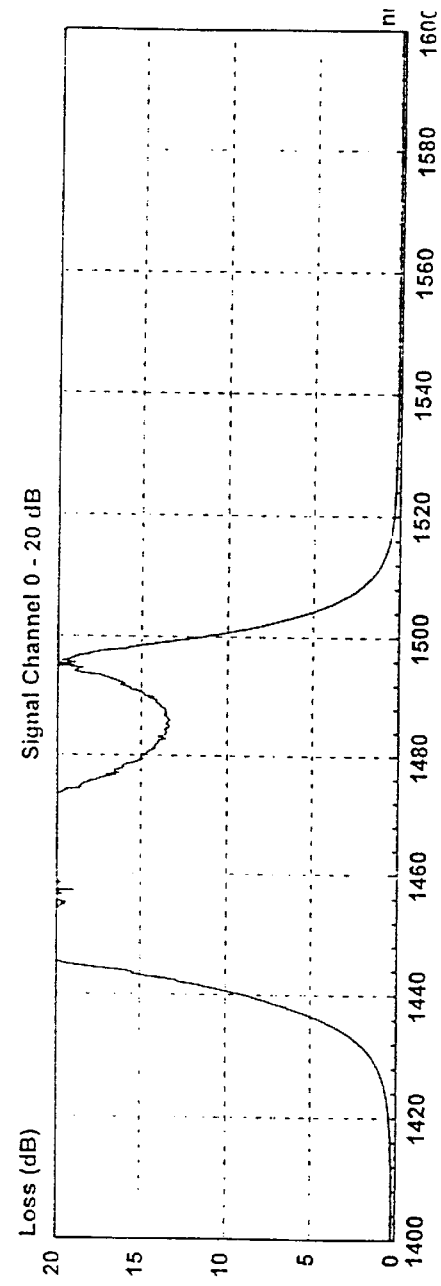

Coupler 13 is a WDM coupler at 1475/1550 nm, from JDS model WD1415B-A30. In FIG. 8a and 8b the losses are shown as a function of the wavelength. In particular in FIG. 8a the losses are shown along the path from coupler 12 (1460 nm+1485 nm) to fiber 9, and in FIG. 8b there are shown the losses along the path from optical fiber 9 (1530–1560 nm) to isolator 14.

The optical isolators 2, 8 and 14 are from E-TEK, model PIFI2PR344100.

A signal at a wavelength in the range of about 1530–1560 nm, with a power that is varied from −3 to +7 dBm, is applied to the input 1.

The pump lasers 3 and 4, both supplied with a current of about 200 mA, provide an output power of about 120 mW each. At the output of coupler 5 a power of about 220 mW is available.

The pump lasers 10 and 11, both supplied with a current of about 650 mA, provide an output power of about 160 mW each. At the output of coupler 12 a power of about 280 mW is available.

Figure 9:
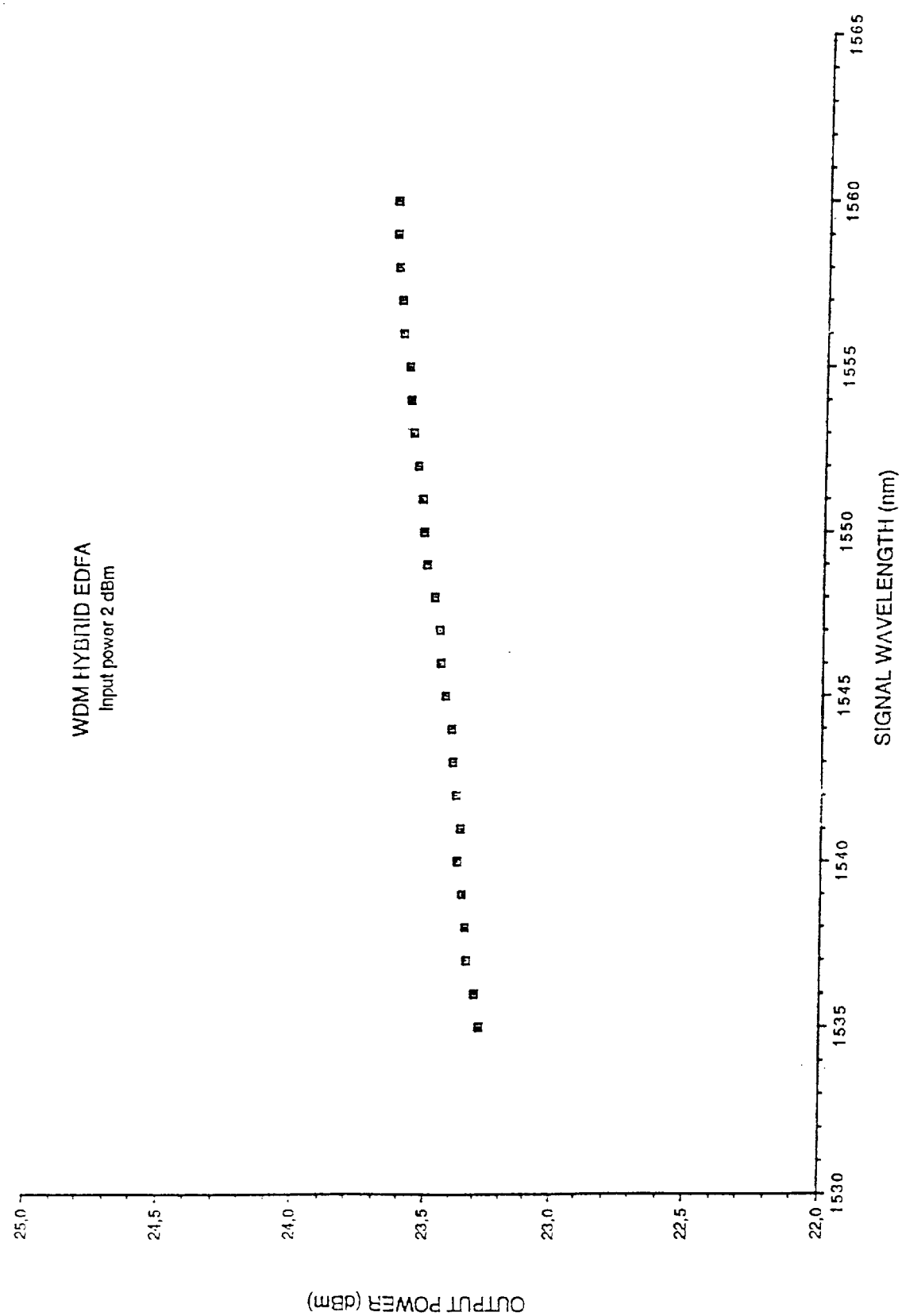
FIG. 9 shows the signal output power of an amplifier according the present invention as a function of the input signal wavelength.

FIG. 9 shows the signal output power of the amplifier 105 as a function of the input signal wavelength from 1535 nm to 1560 nm, with an input signal power Pin of +2 dBm. The output power is between 23.2 and 23.6 dBm.

Figure 10:
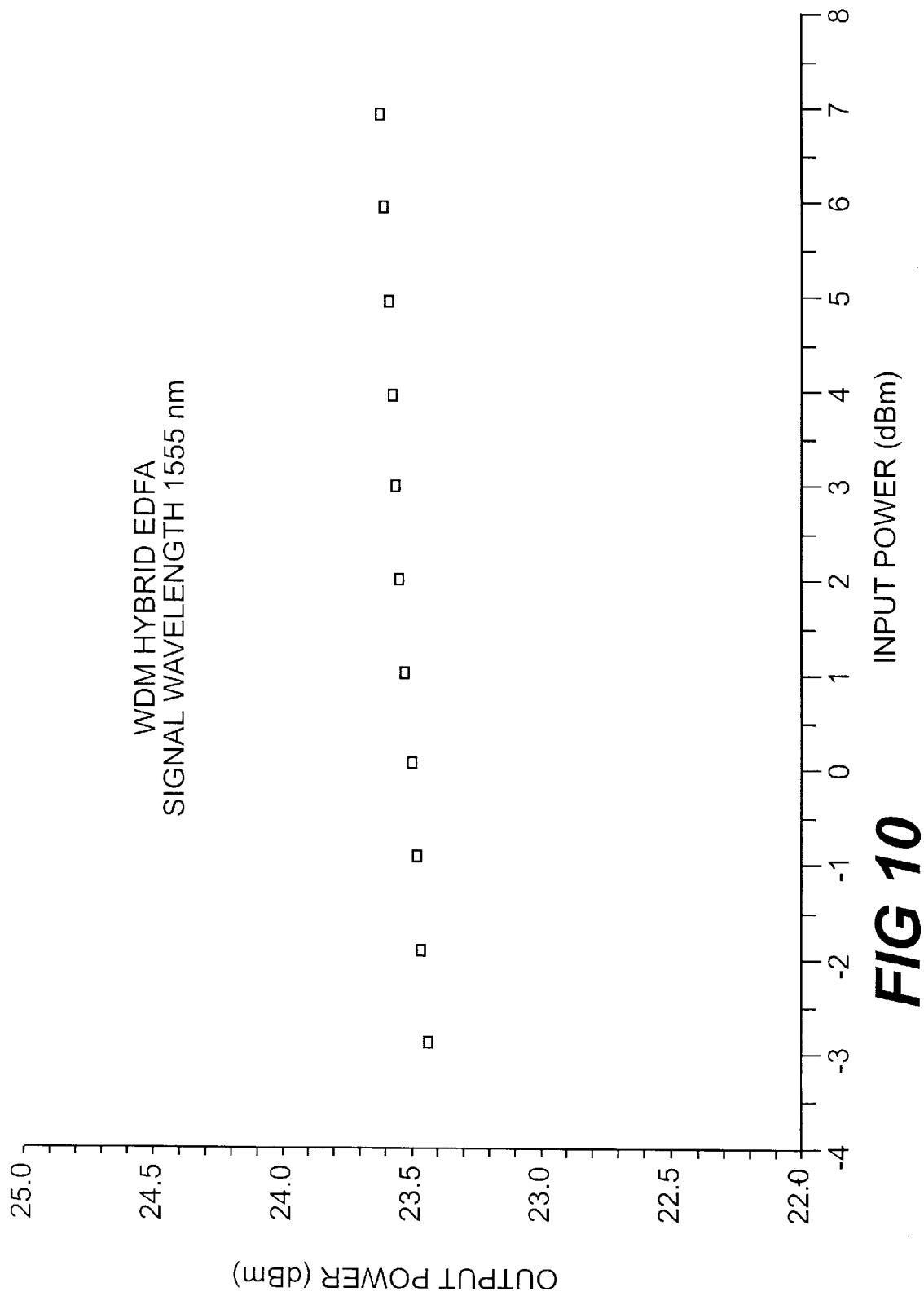
FIG. 10 shows the signal output power of an amplifier according the present invention as a function of the input signal power.

FIG. 10 shows the signal output power of the amplifier 105 as a function of the input signal power Pin from −3 dBm to +7 dBm at the wavelength $\lambda$ of 1555 nm. Varying the input signal power Pin in a range of 10 dBm (from −3 to +7 dBm), the output power is quite stable around 23.5 dBm.

Figure 11:
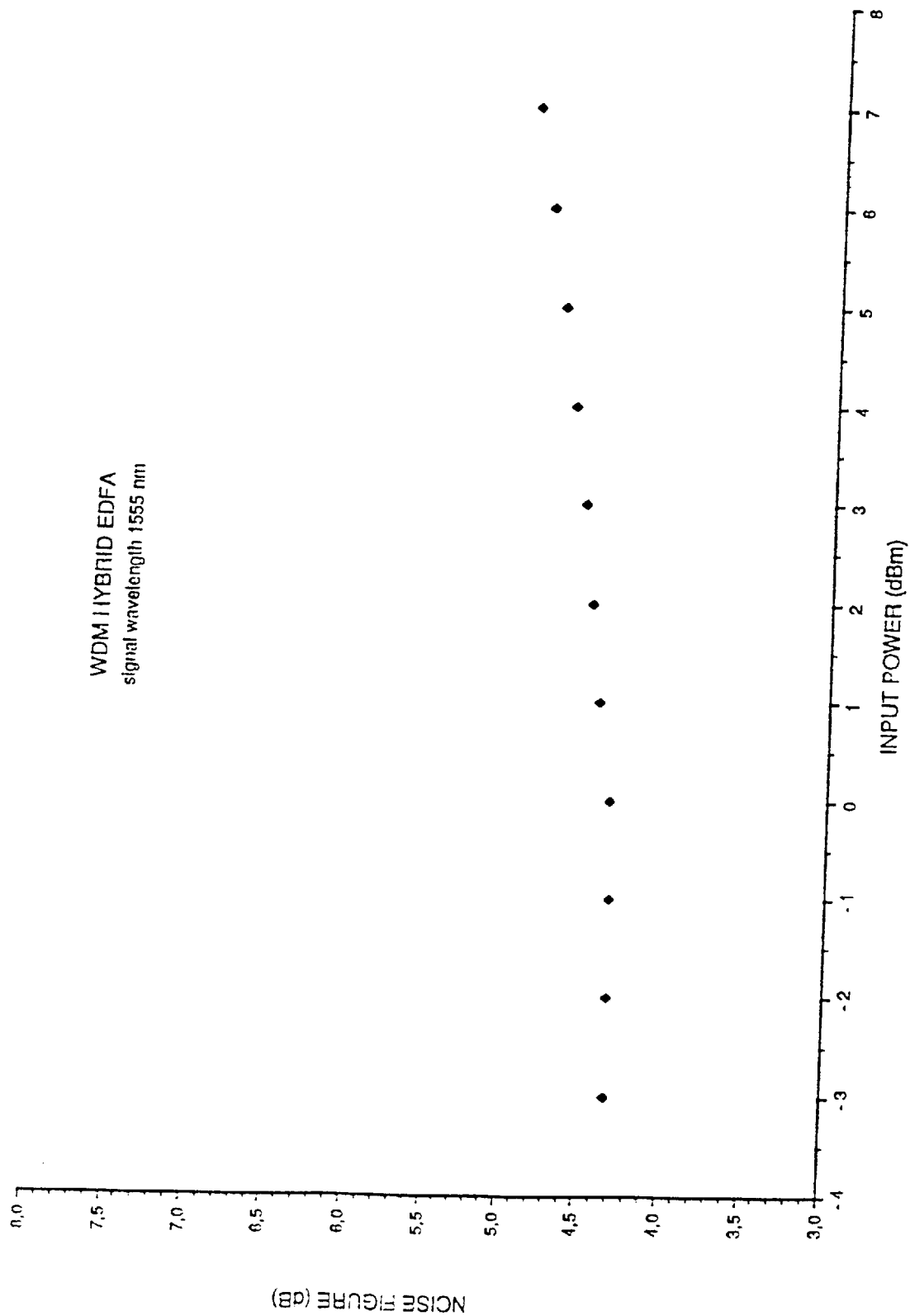
FIG. 11 shows the noise figure (NF) of an amplifier according the present invention as a function of the input signal power.

FIG. 11 shows the noise figure (NF) of the amplifier 105 as a function of the input signal power Pin from −3 dBm to +7 dBm at the wavelength $\lambda$ of 1555 nm. In spite of the high output power, the noise figure is maintained between 4.3 and 5 dB.

Figure 12:
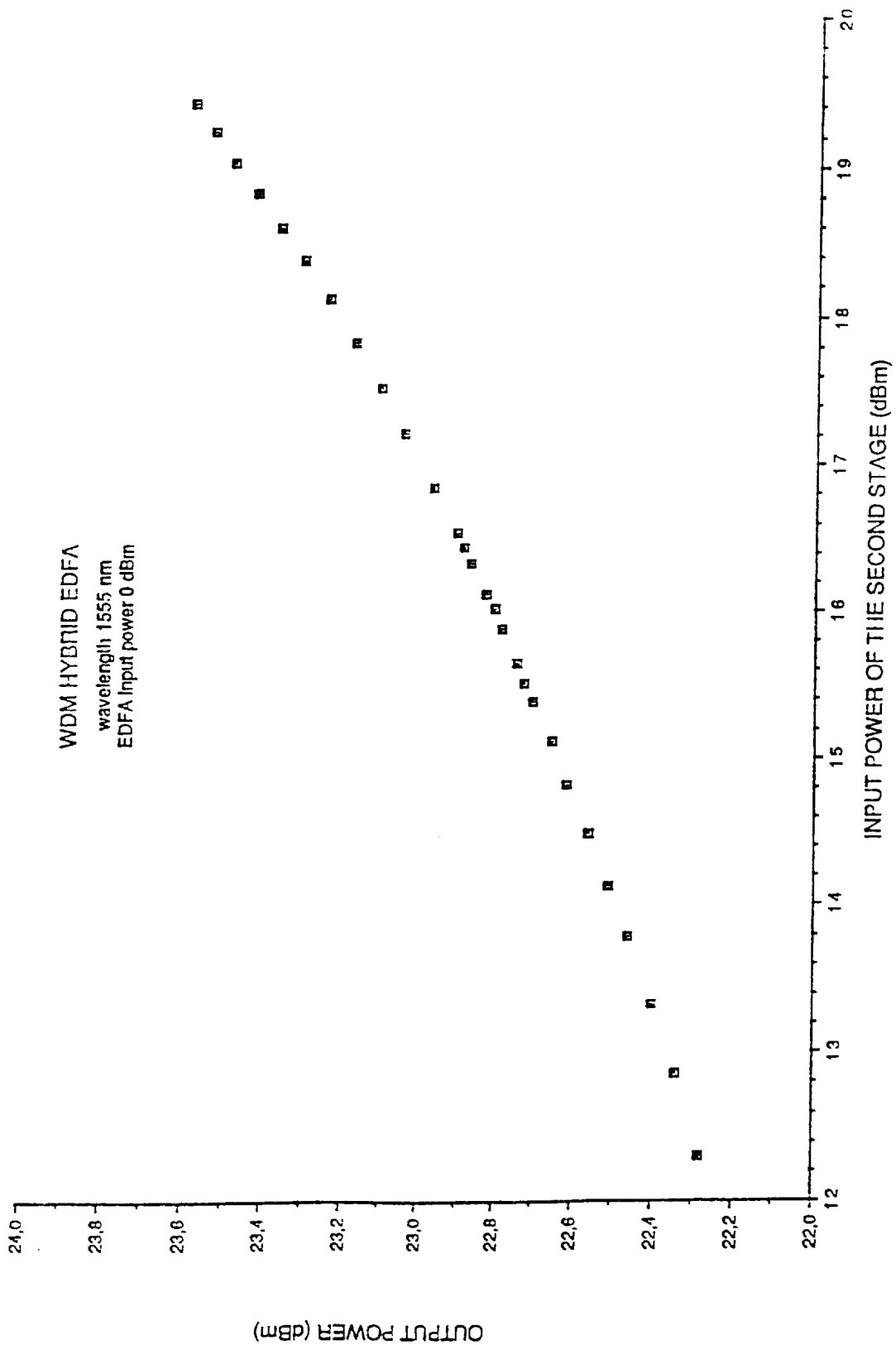
FIG. 12 shows the output power of an amplifier according the present invention as a function of the input power at the input of the second stage of the amplifier.

FIG. 12 shows the output power of the amplifier 105 as a function of the input power at the input of the second stage of the amplifier, that is at the input of the second optical fiber 9. With an input power at the input of the first stage Pin of 0 dBm at the wavelength of 1555 nm, and varying the pump power of the first stage (changing the current of the pump lasers), the input power of the second stage is varied from +12 dBm to +19.5 dBm and the output power of the second stage varies respectively between 22.3 dBm and 23.5 dBm.

Figure 13:
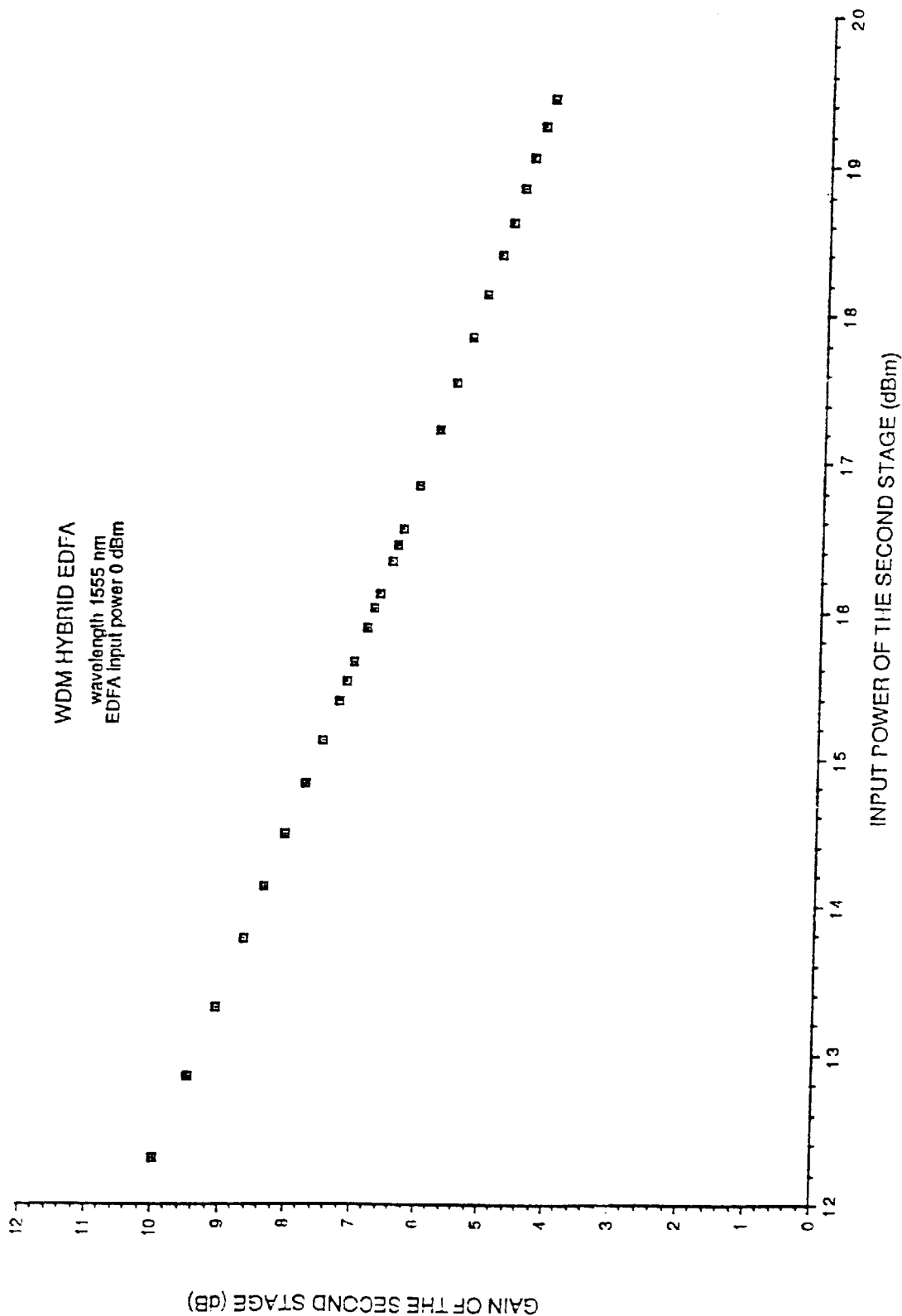
FIG. 13 shows the gain of the second stage of an amplifier according the present invention as a function of the input power at the input of the second stage of the amplifier.

FIG. 13 shows the gain of the second stage of the amplifier 105 as a function of the input power at the input of the second stage of the amplifier, that is at the input of the second optical fiber 9. With an input power at the input of the first stage Pin of 0 dBm at the wavelength of 1555 nm, and varying the pump power of the first stage (changing the current of the pump lasers), the input power of the second stage is varied from +12 dBm to +19.5 dBm and the gain of the second stage varies respectively between 10 dB and 4 dB. With a second stage input power of 19.5 dBm the second stage gain is about 4 dB.

Figure 14:
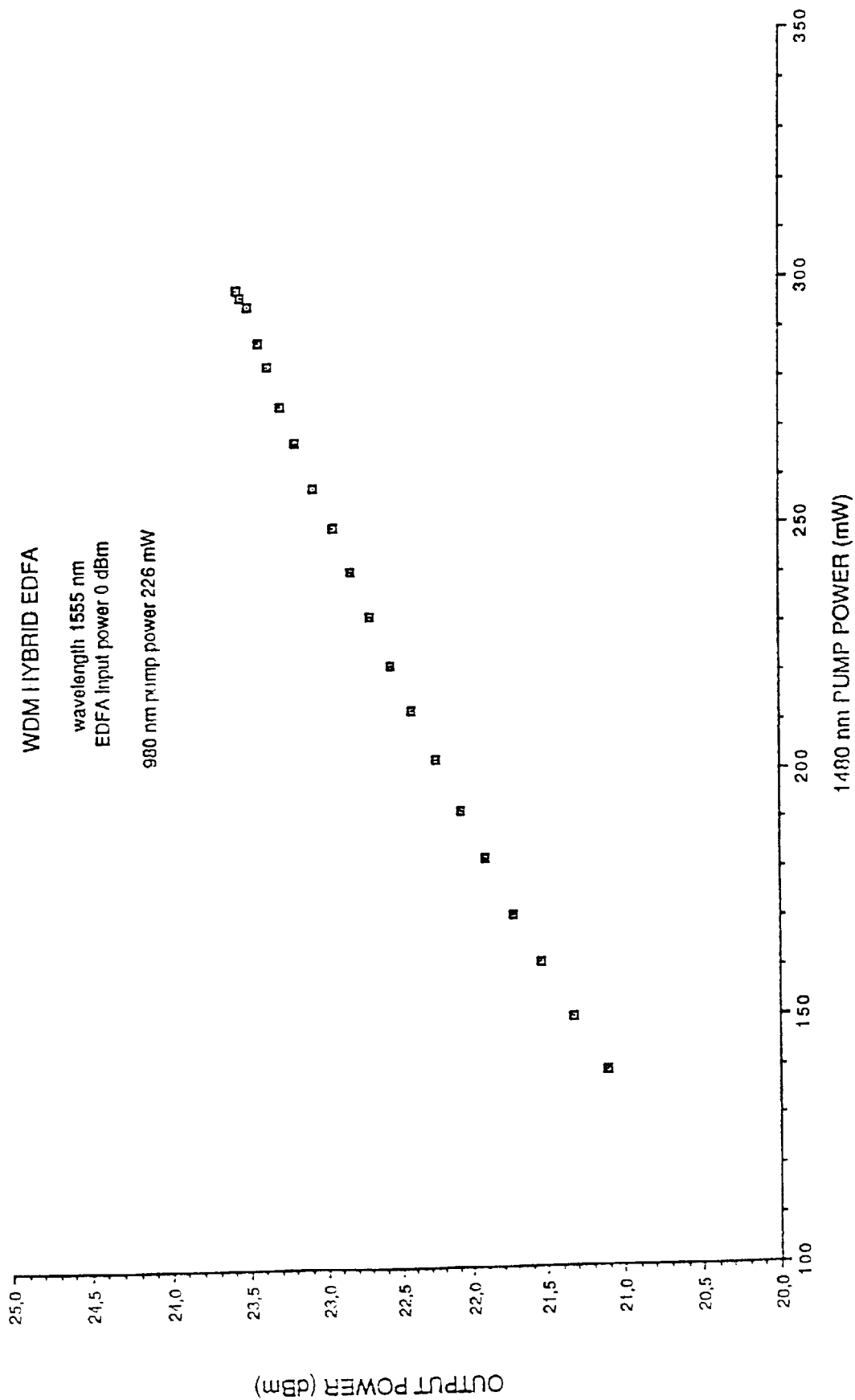
FIG. 14 shows the output power of an amplifier according the present invention as a function of the pump power in the wavelength band of 1480 nm.

FIG. 14 shows the output power of the amplifier 105 as a function of the pump power in the wavelength band of 1480 nm, that is the pump power at the output of the coupler 12. The input of the first stage Pin was of 0 dBm at the wavelength of 1555 nm and the pump power in the wavelength band of 980 nm, that is the pump power at output of the coupler 5, was of about 226 mW. Increasing the 1480 nm pump power from 140 mW to 290 mW the output power was varied between 21 dBm and 23.5 dBm.

In an another experiment of the Applicant, an amplifier output power of about 22.5 dBm, with an input power of 0 dBm, has been achieved using only one pump laser to pump the first stage in the wavelength band of 980 nm, supplying a pump power of 120 mW to the input of coupler 5. The optical power at the input of the second stage was of at least 14 dBm.

Using a single pump laser at the input of coupler 5, the total pump power is decreased but it is possible to use a wavelength equal to the optimum pumping wavelength of the 980 nm band, increasing the pump efficiency.

Use of the amplifier 105 has been so far described in a point to point optical link having no line amplifiers, such as e.g. submarine festoon links. However, use of the amplifier 105 in an optical system having optical line amplifiers is also possible, to increase the span length beyond that presently available.

The amplifier 105 can also be advantageously used in optical fiber CATV systems, e.g. as a booster amplifier. The high available output power allows in this case the distribution of the optical signal to a greater number of users, and/or to increase the length of the fiber links.

I claim:

1. An optical fiber telecommunication system comprising:
   a transmission station producing at least one transmission optical signal in a predetermined wavelength band carrying the information;
   a receiving station for receiving said transmission optical signal;
   an optical fiber line connecting said transmission station and said receiving station, and
   at least one optical fiber amplifier connected along said line for amplifying said transmission optical signal, said amplifier having a first stage and a second stage connected by an optical isolator, in which said second stage comprises:
   an erbium doped fiber;
   pump means comprising two pump sources having two different wavelengths in a first pump wavelength band in the range of 1450–1500 nm;
   a WDM coupling means coupling said different wavelengths as a composite first pump signal;
   a coupler coupling said composite first pump signal and said transmission optical signal to said erbium doped fiber.

2. An optical fiber telecommunication system according to claim 1 characterized that said amplifier has a total optical output power of at least 20 dBm.

3. An optical fiber telecommunication system according to claim 1 characterized that said amplifier has a total optical output power of at least 22 dBm.

4. An optical fiber telecommunication system according to claim 1 characterized that said amplifier is placed closer to the transmission station than to the receiver station.

5. An optical fiber telecommunication system according to claim 1 characterized that said predetermined wavelength band is between 1530 nm and 1560 nm.

6. An optical fiber telecommunication system according to claim 1 characterized that said transmission optical signal is a WDM transmission optical signal.

7. An optical fiber telecommunication system according to claim 1 characterized that further comprises a preamplifier for amplifying said transmission optical signal connected in series along said optical fiber line.

8. An optical fiber telecommunication system according to claim 7 characterized that said preamplifier is placed closer to the receiving station than to the transmitting station.

9. An optical fiber telecommunication system according to claim 1 characterized that said first stage comprises:
   an erbium doped fiber;
   pump means comprising one pump source at a wavelength in a second pump wavelength band;
   a coupler coupling said pump wavelength and said transmission optical signal to said erbium doped fiber.

10. An optical fiber telecommunication system according to claim 1 characterized that said first stage comprises:

an erbium doped fiber;

pump means comprising two pump sources having two different wavelengths in a second pump wavelength band;

a WDM coupling means coupling said different wavelengths as a composite second pump signal;

a coupler coupling said composite second pump signal and said transmission optical signal to said erbium doped fiber.

11. An optical fiber telecommunication system according to claims 9 or 10 characterized that said composite second pump signal and said transmission optical signal are co-propagating.

12. An optical fiber telecommunication system according to claim 1 characterized that said composite first pump signal and said transmission optical signal are counter-propagating.

13. An optical fiber telecommunication system according to claims 1 or 9 or 10 characterized that at least one of said pump sources comprises a fiber grating filter.

14. An optical fiber telecommunication system according to claims 1 or 9 or 10 characterized that two of said pump sources of one amplifier stage comprise fiber grating filters.

15. An optical fiber telecommunication system according to claims 9 or 10 characterized that said second pump wavelength band is in the range of 960–1000 nm.

16. An optical fiber telecommunication system according to claim 1 characterized that said first stage precedes said second stage in the transmission optical signal direction.

17. An optical fiber telecommunication system according to claim 1 characterized that further comprises an optical isolator at the input of the first stage.

18. An optical fiber telecommunication system according to claim 1 characterized that further comprises an optical isolator at the output of the second stage.

19. An optical fiber telecommunication system according to claim 1 characterized that the wavelength distance of said two pump sources at different wavelengths in said first pump wavelength band is less than 30 nm.

20. An optical fiber telecommunication system according to claim 10 characterized that the wavelength distance of said two pump sources at different wavelengths in said second pump wavelength band is less than 15 nm.

21. An optical fiber telecommunication system according to claims 1 or 10 characterized that said WDM coupling means includes an interferential filter.

22. Method for amplifying a transmission optical signal comprising the steps of:

supplying a pump signal having at least one wavelength in the range of 960–1000 nm to a first rare earth doped optical fiber;

combining two pump signals having two different wavelengths in the range of 1450–1500 nm by WDM multiplexing to form a multiplexed pump signal;

pumping a second rare earth doped optical fiber by said multiplexed pump signal;

supplying said transmission optical signal to said first and said second rare earth doped optical fiber;

preventing the light to travel from said second rare earth doped optical fiber to said first rare earth doped optical fiber.

23. Method according to claim 22 characterized that said predetermined total optical output power from said second rare earth doped optical fiber is of at least 20 dBm.

24. Method according to claim 22 characterized that said predetermined total optical output power from said second rare earth doped optical fiber is of at least 22 dBm.

25. Method according to claim 22 characterized that said pump signal in said first rare earth doped optical fiber and said transmission optical signal are co-propagating.

26. Method according to claim 22 characterized that said pump signal in said second rare earth doped optical fiber and said transmission optical signal are counter-propagating.

27. Method according to claim 22 characterized of providing a total optical power at the input of said second rare earth doped optical fiber of at least 17 dBm.

28. An optical fiber amplifier for amplifying a transmission optical signal comprising:

a first stage and a second stage;

an isolator placed between the first stage and the second stage;

in which said first stage comprises:

an erbium doped fiber;

pump means comprising a first pump source at a wavelength in a first stage pump wavelength band;

a coupler coupling said pump wavelength and said transmission optical signal to said erbium doped fiber; and said second stage having a total optical output power greater than 20 dBm and comprising:

an erbium doped fiber;

pump means comprising two pump sources at different wavelengths in a second stage pump wavelengths band;

a WDM coupling means coupling said different wavelengths as a composite second stage pump signal;

a coupler coupling said composite second stage pump signal and said transmission optical signal to said erbium doped fiber.

29. An optical fiber amplifier according to claim 28 characterized that said first stage further comprises:

pump means comprising a second pump source at a different wavelength than the first pump source in a first stage pump wavelength band;

a WDM coupling means coupling said different wavelengths as a composite first stage pump signal;

the coupler coupling said composite first stage pump signal and said transmission optical signal to said erbium doped fiber.

30. An optical fiber amplifier according to claim 28 characterized that said total optical output power is at least 22 dBm.

31. An optical fiber amplifier according to claim 28 characterized that said second stage has a total optical input power greater than 17 dBm.

* * * * *

UNITED STATES PATENT AND TRADEMARK OFFICE
CERTIFICATE OF CORRECTION

PATENT NO.    : 6,031,646
DATED         : February 29, 2000
INVENTOR(S)   : Lucjan SNIADOWER It is certified that error appears in the above-identified patent and that said Letters Patent is hereby corrected as shown below:

Title Page, Item [22], in the Filing Date, "Jun. 4, 1997" should read --Jun. 4, 1998--.

Title Page, Item [57], in the Abstract, line 18, "A WDM" should read --a WDM--.

Signed and Sealed this

Tenth Day of April, 2001

*Attest:*

NICHOLAS P. GODICI

*Attesting Officer*    *Acting Director of the United States Patent and Trademark Office*